(12) United States Patent
De Lagrange et al.

(10) Patent No.: US 12,177,446 B2
(45) Date of Patent: Dec. 24, 2024

(54) METHOD AND APPARATUS FOR DETERMINING CHROMA QUANTIZATION PARAMETERS WHEN USING SEPARATE CODING TREES FOR LUMA AND CHROMA

(71) Applicant: InterDigital VC Holdings, Inc., Wilmington, DE (US)

(72) Inventors: Philippe De Lagrange, Betton (FR); Karam Naser, Mouaze (FR); Philippe Bordes, Laille (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/278,811

(22) PCT Filed: Sep. 19, 2019

(86) PCT No.: PCT/US2019/051821
§ 371 (c)(1),
(2) Date: Mar. 23, 2021

(87) PCT Pub. No.: WO2020/068531
PCT Pub. Date: Apr. 2, 2020

(65) Prior Publication Data
US 2022/0038704 A1    Feb. 3, 2022

(30) Foreign Application Priority Data

Sep. 24, 2018 (EP) ..................................... 18306236
Oct. 18, 2018 (EP) ..................................... 18306371

(51) Int. Cl.
H04N 19/156 (2014.01)
H04N 19/105 (2014.01)
(Continued)

(52) U.S. Cl.
CPC ......... *H04N 19/132* (2014.11); *H04N 19/105* (2014.11); *H04N 19/176* (2014.11); *H04N 19/186* (2014.11); *H04N 19/70* (2014.11)

(58) Field of Classification Search
CPC .. H04N 19/132; H04N 19/105; H04N 19/176; H04N 19/186; H04N 19/70
See application file for complete search history.

(56) References Cited

U.S. PATENT DOCUMENTS

2013/0259141 A1    10/2013    Van Der Auwera et al.
2014/0003497 A1    1/2014    Sullivan et al.
(Continued)

FOREIGN PATENT DOCUMENTS

CN    104205836 A    12/2014
CN    108293124 A    7/2018
(Continued)

OTHER PUBLICATIONS

Chernyak et al., "Delta QP and Chroma QP Offset for Separate Tree", Joint Video Experts Team (JVET) of ITU-T SG 16 WP3 and ISO/IEC JTC 1/SC 29/WG 11, Document: JVET-L0428-v1, 12th Meeting, Macao, Oct. 3, 2018, 5 pages.

*Primary Examiner* — Neil R Mikeska
(74) *Attorney, Agent, or Firm* — Condo Roccia Koptiw LLP

(57) ABSTRACT

A decoding method is disclosed. A quantization parameter of at least one luma block is obtained. The at least one luma block comprises a luma sample co-located with at least one chroma sample selected in a current chroma block. The luma and chroma blocks are coded in dual tree mode. A quantization parameter of the current chroma block is then determined responsive to the quantization parameter of the at (Continued)

least one luma block. Finally, the current chroma block is decoded using the quantization parameter of the current chroma block.

26 Claims, 4 Drawing Sheets

(51) Int. Cl.
*H04N 19/132* (2014.01)
*H04N 19/164* (2014.01)
*H04N 19/172* (2014.01)
*H04N 19/176* (2014.01)
*H04N 19/186* (2014.01)
*H04N 19/187* (2014.01)
*H04N 19/31* (2014.01)
*H04N 19/37* (2014.01)
*H04N 19/46* (2014.01)
*H04N 19/587* (2014.01)
*H04N 19/70* (2014.01)

(56) References Cited

U.S. PATENT DOCUMENTS

| | | | |
|---|---|---|---|
| 2015/0003518 A1 | 1/2015 | Nguyen et al. | |
| 2016/0261864 A1 | 9/2016 | Samuelsson et al. | |
| 2018/0020241 A1* | 1/2018 | Li | H04N 19/50 |
| 2018/0270483 A1* | 9/2018 | Shibahara | H04N 19/176 |
| 2018/0376143 A1 | 12/2018 | Andersson et al. | |
| 2019/0174136 A1* | 6/2019 | Jun | H04N 19/463 |
| 2020/0195970 A1* | 6/2020 | Ikai | H04N 19/186 |
| 2020/0296417 A1* | 9/2020 | Ko | H04N 19/176 |
| 2021/0281846 A1* | 9/2021 | Hsiang | H04N 19/126 |
| 2021/0337202 A1* | 10/2021 | Xiu | H04N 19/176 |

FOREIGN PATENT DOCUMENTS

| | | |
|---|---|---|
| WO | 2014/205561 A1 | 12/2014 |
| WO | 2016/074147 A1 | 5/2016 |
| WO | 2016/074174 A1 | 5/2016 |
| WO | WO 2017203930 A1 | 11/2017 |
| WO | WO 2017206826 A1 | 12/2017 |
| WO | WO 2017219342 A1 | 12/2017 |
| WO | WO 2018013706 A1 | 1/2018 |
| WO | 2020035066 A1 | 2/2020 |
| WO | 2020057662 A1 | 3/2020 |

* cited by examiner

METHOD AND APPARATUS FOR DETERMINING CHROMA QUANTIZATION PARAMETERS WHEN USING SEPARATE CODING TREES FOR LUMA AND CHROMA

CROSS REFERENCE TO RELATED APPLICATIONS

This application is the national stage entry under 35 U.S.C. § 371 of International Application PCT/US2019/051821, filed Sep. 19, 2019, which was published in accordance with PCT Article 21(2) on Apr. 2, 2020, in English, and which claims the benefit of European Patent Application No. 18306236.3, filed Sep. 24, 2018 and European Patent Application No. 18306371.8, filed Oct. 18, 2018.

1. TECHNICAL FIELD

The present embodiments generally relate to a method and an apparatus for video encoding or decoding, and more particularly, to a method and an apparatus for video encoding or decoding using quantization.

2. BACKGROUND ART

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors or prediction residuals, are transformed, quantized and entropy coded. During encoding the original image block is usually partitioned/split into sub-blocks possibly using quad-tree partitioning. To reconstruct the video, the compressed data is decoded by inverse processes corresponding to the prediction, transform, quantization and entropy coding.

3. BRIEF SUMMARY

One or more of the present embodiments provide a decoding method comprising:
  obtaining a quantization parameter of at least one luma block comprising a luma sample co-located with at least one chroma sample selected in a current chroma block, wherein the luma and chroma blocks are coded in dual tree mode;
  determining a quantization parameter of said current chroma block responsive to said quantization parameter of said at least one luma block;
  decoding said current chroma block using said quantization parameter of said current chroma block.

One or more of the present embodiments provide an encoding method comprising:
  obtaining a quantization parameter of at least one luma block comprising a luma sample co-located with at least one chroma sample selected in a current chroma block, wherein the luma and chroma blocks are coded in dual tree mode;
  determining a quantization parameter of said current chroma block responsive to said quantization parameter of said at least one luma block;
  encoding said current chroma block using said quantization parameter of said current chroma block.

One or more of the present embodiments provide a decoding apparatus comprising one or more processors configured to perform:
  obtaining a quantization parameter of a at least one luma block comprising a luma sample co-located with a at least one chroma sample selected in a current chroma block, wherein the luma and chroma blocks are coded in dual tree mode;
  determining a quantization parameter of said current chroma block responsive to said quantization parameter of said at least one luma block;
  encoding decoding said current chroma block using said quantization parameter of said current chroma block.

One or more of the present embodiments provide an encoding apparatus comprising one or more processors configured to perform:
  obtaining a quantization parameter of at least one luma block comprising a luma sample co-located with at least one chroma sample selected in a current chroma block, wherein the luma and chroma blocks are coded in dual tree mode;
  determining a quantization parameter of said current chroma block responsive to said quantization parameter of said at least one luma block;
  encoding said current chroma block using said quantization parameter of said current chroma block.

One or more of the present embodiments also provide a computer readable storage medium having stored thereon instructions for encoding or decoding video data according to at least part of any of the methods described above. One or more embodiments also provide a bitstream generated according to the encoding methods described above. One or more embodiments also provide a computer readable storage medium having stored thereon a bitstream generated according to the encoding methods described above. One or more embodiments also provide a method and apparatus for transmitting or receiving the bitstream generated according to the encoding methods described above. One or more embodiments also provide a computer program product including instructions for performing at least part of any of the methods described above.

4. BRIEF SUMMARY OF THE DRAWINGS

5. DETAILED DESCRIPTION

Figure 1:
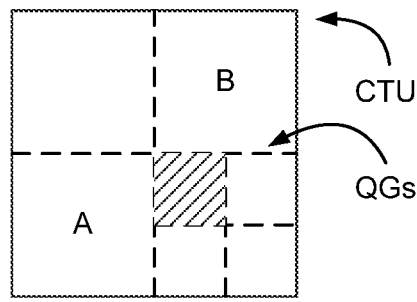
FIG. 1 depicts a coding tree unit and quantization groups as used in HEVC for luma QP derivation.

In HEVC coding, a picture is partitioned into CTUs of square shape with a configurable size typically 64×64, 128×128, or 256×256. A CTU is the root of a quad-tree partitioning into 4 square Coding Units (CU) of equal size, i.e. half of the parent block size in width and in height. A quad-tree is a tree in which a parent node can be split into four child nodes, each of which may become parent node for another split into four child nodes. In HEVC, a coding Block (CB) is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU.

In more recent encoding systems, a CTU is the root of a coding tree partitioning into Coding Units (CU). A coding tree is a tree in which a parent node can be split into child nodes (e.g. into 2, 3 or 4 child nodes), each of which may become parent node for another split into child nodes. In addition to the quad-tree split mode, new split modes (binary tree symmetric split modes, binary tree asymmetric split modes and triple tree split modes) are also defined that increase the total number of possible split modes. The coding tree has a unique root node, e.g. a CTU. A leaf of the coding tree is a terminating node of the tree. Each node of the coding tree represents a block that may be further split into smaller blocks also named sub-blocks. Once the partitioning of a CTU into CUs is determined, CUs corresponding to the leaves of the coding tree are encoded. The partitioning of a CTU into CUs and the coding parameters used for encoding each CU (corresponding to a leaf of the coding tree) may be determined on the encoder side through a rate distortion optimization procedure.

As said, splitting can be recursive. The split depth of a current block thus refers to the number of recursive splits for obtaining the current block.

In the present application, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

The blocks can then be predicted and the residuals (difference between original and prediction) are transformed to calculate the frequency coefficients. On the encoder side, quantization usually comprises dividing resulting transformed coefficient by a specific quantization scale, also named quantization step size (Qstep). The decoder then multiplies the result by the same Qstep to recover an approximation of the original coefficient. Usually, a quantization parameter (QP) is used to determine the quantization step size Qstep. As an example, in HEVC, the QP can take 52 values from 0 to 51 (QP range). An increase of 1 in QP means an increase of the quantization step size Qstep by approximately 12% (i.e., $2^{1/6}$). The resulting relationship between QP and the equivalent quantization step size is given by the following equation in HEVC:

$$Qstep(QP) = (2^{1/6})^{QP-4} \qquad \text{(eq. 1)}$$

Other functions and QP range than the one defined above in (eq.1) may be used in the embodiments described below.

A local QP offset may be used for local adjustment of quantization step (for luma and chroma). Local adjustment of quantization step usually comprises specifying an offset to be added to the quantization parameter (QP) of the current picture (or part of it, e.g. slice). This local QP offset can be specified for each block (as in H264), or group of blocks with a given maximum split depth (as in HEVC).

FIG. 1 illustrates QP derivation in HEVC. The smallest unit that share a common local QP offset is called a Quantization Group (QG), and is defined by a maximum split depth, or equivalently, a minimum size, because all splits are quad-splits. Similarly, codecs in development use a maximum split depth to accommodate for other split types. All blocks resulting from further splits belong to the same quantization group and share the same QP offset.

Luma QP is usually predicted using a QP that was derived for left and top neighboring coding units (A and B on the FIG. 1). However, when A or B falls out of the CTU, their QP is replaced by the QP of the previous coded block (in coding order). QP offset is then added to this prediction to give the QP of the current block.

Chroma QP derivation starts from luma QP (QPy), and can be further adjusted with local offsets, which are defined by groups similar to luma Quantization Groups (QG). More precisely, in HEVC, QP adjustments for chroma (i.e. Cb and Cr) comprises adding offsets to the luma QP of a spatially corresponding luma block. As an example, an offset defined in the PPS, an offset defined in a slice header and also a local QP offset may be added. This local offset is either zero or defined by an index to tables for blue (Cb) and red (Cr) chroma. The index gives the actual offset to be applied to QPy. The tables may be transmitted in the PPS range extension. The resulting QPs are then converted to chroma QPs using a mapping table defined in the standard (e.g. Table 1). In HEVC, local QP adjustment can be specified separately for luma and chroma with different granularity, i.e. with different values of maximum split depth.

Figure 2:
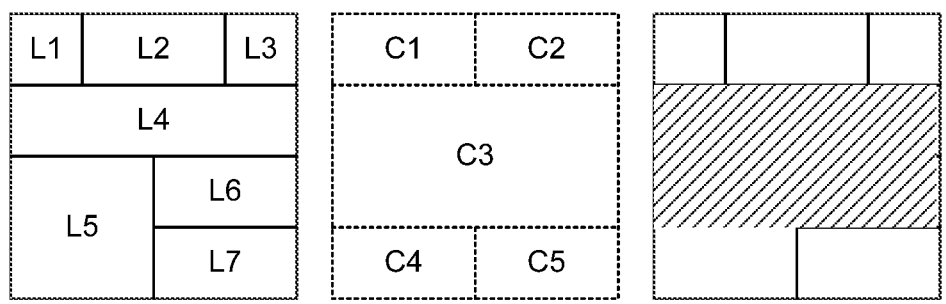
FIG. 2 illustrates the principle of dual coding tree.

FIG. 2 illustrates the principle of dual coding tree with luma blocks (L1 to L7) on the left, and corresponding chroma blocks (C1 to C5) in the middle. Dual coding tree refers to splitting of a picture into coding blocks that may be different for luma and chroma. In such a case, a chroma block may have several spatially corresponding luma blocks instead of a single one. In the case where a luma CTU and a chroma CTU have the same size, a corresponding luma block (e.g. a group of CUs) or corresponding luma blocks are blocks that spatially correspond to the same portion of the picture, i.e. that are co-located. Said otherwise, when the luma CTU is superposed to the chroma CTU, the luma block(s) that intersect the chroma block are the corresponding luma blocks. In the case where, the format is 4:2:0, the chroma signal is downscaled with respect to the luma signal. The spatial correspondence between luma blocks and chroma blocks takes into account this downscaling.

In the case of dual coding tree, a quantization parameter known as chroma base QP or more simply base QP, is encoded explicitly in the bitstream, e.g. with the chroma. This base QP is used instead of the luma QP (QPy) for deriving the chroma QP. Coding of the base QP for chroma is thus costly.

To this aim, the base QP may be replaced by the slice QP. Therefore, bits are saved since base QP is no more explicitly coded in the bitstream. However, slice QP may be far from nearby luma QPs. Thus, using the QP slice may decrease coding quality.

For luma QP prediction, the first block of the CTU uses the QP of a previous coded block because its neighbors A and B are out the current CTU. In the case of dual tree, luma and chroma coding trees are interleaved (like in Joint Exploratory Model or Versatile Video Coding). Therefore, when starting a new luma CTU, the previous coded block is a chroma CU. This introduces a dependency of luma on chroma which can be a problem since it prevents independent decoding of luma.

One way to solve dependency of luma decoding on chroma is to use separate luma/chroma QP prediction contexts at the expense of an additional QP prediction context.

At least one embodiment thus proposes an implicit derivation of chroma base QP in case of dual coding tree to save bits compared to explicit coding. Advantageously, at least one embodiment solves the problem of dependency of luma decoding on chroma while avoiding the use of an additional QP prediction context.

At least one embodiment thus proposes an implicit derivation of chroma base QP from co-located luma blocks in the same picture. The chroma base QP for a current chroma block can be derived based on one of the following items:
 a) a function (e.g. average, median . . . ) of the QP(s) of the luma area co-located with the current chroma block,
 b) the QP of the luma block co-located with the top-left sample of the current chroma block, or the QP of the luma block co-located with the center sample of the current chroma,
 c) a function (e.g. average, median, . . . ) of the QP(s) of luma block(s) co-located with selected samples in the current chroma block,
 d) a function (e.g. average, median, . . . ) of the QP(s) of luma block(s) co-located with selected samples in the current chroma block, wherein the samples are selected based on chroma block shape.

Figure 3:
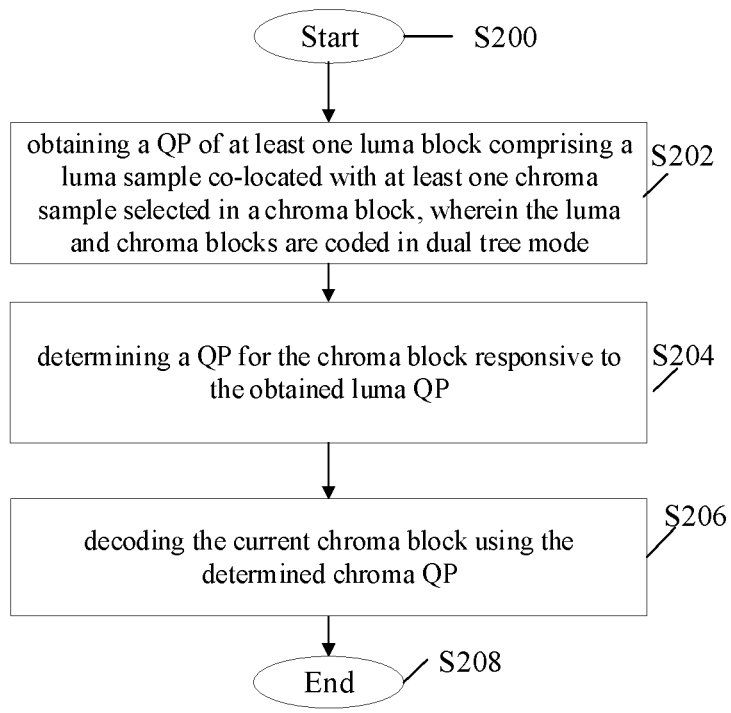
FIG. 3 depicts a flowchart of a decoding method according to an embodiment.

FIG. 3 discloses a flowchart of a decoding method according to one embodiment. The method starts at S200. A QP of at least one luma block comprising at least one luma sample co-located with at least one chroma sample of a current chroma block is obtained (S202). This luma QP may be used as the chroma base QP or may be used to derive the chroma base QP. The chroma sample may be selected based on the shape of the chroma block (method d)). A single chroma sample may be selected (e.g. the top-left of the center sample of the chroma block as in method b)). More than one chroma sample may be selected (method c)).

A QP for the chroma block is determined responsive to the obtained luma QP (S204). The chroma QP $QP_{chroma}$ is a function of the obtained luma QP.

Various functions may be used. In an embodiment, $QP_{chroma}=QP_{base}$, where $QP_{base}$ is the QP derived from the QPs of co-located luma blocks at S202. In another embodiment, $QP_{chroma}=QP_{base}+$offset, where $QP_{base}$ is the luma QP obtained at S202. In yet another embodiment, $QP_{chroma}=f(QP_{base}+$offset), where $QP_{base}$ is the luma QP obtained at S202. Offset may be a slice offset, a local offset, or an offset defined at a picture level, e.g. in a PPS (Picture Parameter Set). In a variant, offset is a sum of a slice offset (e.g slice_cb_qp_offset in HEVC), a PPS offset (e.g. pps_cb_qp_offset in HEVC) and a local offset (e.g. CuQpOffsetCb in HEVC). In another variant, offset is a sum of at least two offsets among a slice offset (e.g slice_cb_qp_offset in HEVC), a PPS offset (e.g. pps_cb_qp_offset in HEVC) and a local offset (e.g. CuQpOffsetCb in HEVC). The local offset may be decoded (respectively encoded) from (respectively in) the bitstream for the chroma block or at least one syntax element is decoded (respectively encoded) from which the local offset may be determined. The embodiments are not limited by the function f( ). An example of a function f( ) is given below with respect to HEVC. However, other function than the one defined below may be used.

In HEVC, variables $qPi_{cb}$ and $qPi_{cr}$ are determined where $qPi_{cb}=\text{Clip3}(-QpBd\text{Offset}C,57,QpY+pps\_cb\_qp\_\text{off-}$
$\text{set}+\text{slice}\_cb\_qp\_\text{offset}+CuQp\text{Offset}Cb)$ $qPiCr=\text{Clip3}(-QpBd\text{Offset}C,57,QpY+pps\_cr\_qp\_\text{off-}$
$\text{set}+\text{slice}\_cr\_qp\_\text{offset}+CuQp\text{Offset}Cr)$ Clip3(x,y,z) is a function that returns x if z<x; y if z>y and z otherwise.

CuQpOffsetCb and CuQpOffsetCr are variables derived from syntax elements cu_chroma_qp_offset_idx. cu_chroma_qp_offset_idx, when present, specifies the index into the cb_qp_offset_list[ ] and cr_qp_offset_list[ ] that is used to determine the value of CuQpOffsetCb and CuQpOffsetCr.

QpBdOffsetC is the value of the chroma quantization parameter range offset. QpBdOffsetC=6*bit_depth_chroma_minus8. bit_depth_chroma_minus8 is a syntax element that specifies the bit depth of the samples of the chroma arrays BitDepthC and the value of the chroma quantization parameter range offset QpBdOffsetC. The variables qPCb and qPCr are set equal to the value of QpC as specified in the mapping table 1 below based on the index qPi equal to qPiCb and qPiCr, respectively.

The chroma quantization parameters for the Cb and Cr components, Qp'Cb and Qp'Cr, are derived as follows:

$Qp'Cb=qPCb+QpBd\text{Offset}C$ $Qp'Cr=qPCr+QpBd\text{Offset}C$

TABLE 1

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $Qp_c$ | =qPi | 29 | 30 | 31 | 32 | 33 | 33 | 34 | 34 | 35 | 35 | 36 | 36 | 37 | 37 | =qPi − 6 |

The chroma block is then decoded (S206) using the determined chroma QP.

The method ends at step S108.

Figure 4:
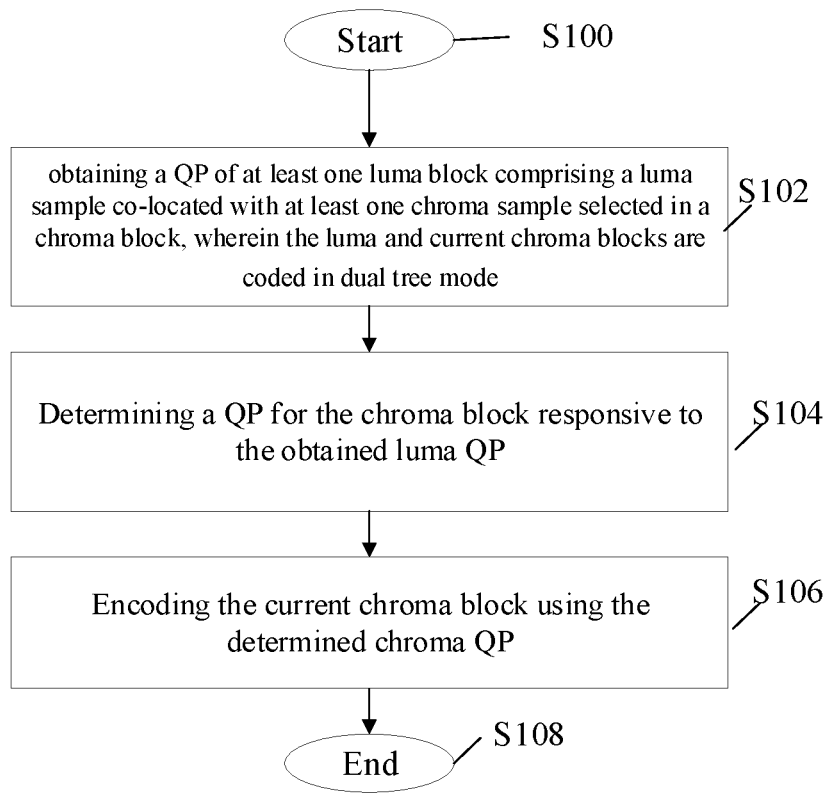
FIG. 4 depicts a flowchart of an encoding method according to an embodiment.

FIG. 4 discloses a flowchart of an encoding method according to one embodiment. The method starts at S100. A QP of at least one luma block comprising at least one luma sample co-located with at least chroma sample of a current chroma block is obtained (S102). This luma QP may be used as the chroma base QP or may be used to derive the chroma base QP. The chroma sample may be selected based on the shape of the chroma block (method d)). A single chroma sample may be selected (e.g. the top-left or the center sample of the chroma block as in method b)). More than one chroma sample may be selected (method c)).

A QP for the chroma block is determined responsive to the obtained luma QP (S104). The chroma QP is a function of the obtained luma QP. Various functions may be used. The embodiments disclosed for the decoding method also apply for the encoding method. In an example, $QP_{chroma}=f(QP_{base}+$offset). Offset may be a slice offset, a local offset, or an offset defined at a picture level, e.g. in a PPS (Picture Parameter Set). In a variant, offset is a sum of a slice offset, a PPS offset and a local offset. In another variant, offset is a sum of at least two offsets among a slice offset, a PPS offset and a local offset. The local offset may be encoded in the bitstream for the chroma block. The chroma block is then encoded (S106) using the determined chroma QP.

The method ends at step S108.

The following embodiments proposes different methods for obtaining (S102, S202) a base chroma QP denoted $QP_{base}$ from QPs of co-located luma blocks (i.e. in the same picture, and matching split tree). In the case where different luma/chroma scales are used because, for example, of 4:2:0 chroma format, chroma blocks are rescaled.

a) Intersecting Area Possibly Weighted Average

FIG. 2 shows an example of a dual coding tree, with luma blocks (L1 to L7) on the left, and corresponding chroma blocks (C1 to C5) in the middle. The stripped area on the right shows the luma area covered by the chroma block C3.

The "intersecting area-weighted average" method comprises taking as base chroma QP the average of the QPs of luma blocks intersecting the area co-located with the current chroma block. In the example of FIG. 2, for block C3, $QP_{base}(C3)=(QP(L4)+QP(L6)+QP(L5))/3$. It can also be an approximation of $(QP(L4)+QP(L6)+QP(L5))/3$ because of rounding errors.

In a variant, each luma QP is weighted by the intersecting surface of the luma and chroma blocks relative to the surface of the current chroma block.

In the example of FIG. 2, for block C3, $QP_{base}(C3)=QP(L4)/2+QP(L6)/4+QP(L5)/4$, because L4 covers ½ of the intersection, and L5 and L6 each covers ¼. It can also be an approximation of $QP(L4)/2+QP(L6)/4+QP(L5)/4$ because of rounding errors.

In a variant, other functions than the average can be used such as for example median, min, max, etc.

b) Selected Pixel Match

In another embodiment, a reference sample is selected in the chroma block. The chroma base QP is then defined as the QP of the luma block containing the luma sample spatially corresponding, i.e. co-located (possibly taking into account rescaling in case chroma is subsampled with respect to luma) to this reference sample.

Figure 5:
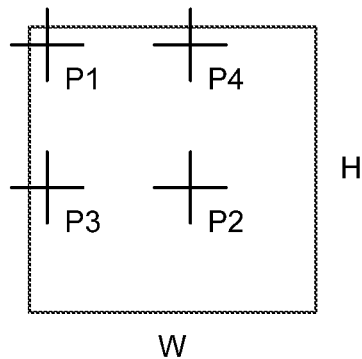
FIG. 5 depicts reference chroma samples in a chroma block according to various embodiments.

Reference chroma sample can be for example the top-left corner (0,0) of the chroma block, the center sample (W/2, H/2), the center-left sample (0, H/2), the center-top sample (W/2, 0), denoted P1, P2, P3, P4 respectively in the FIG. 5, where W is the width of the block, and H is the height of the block.

The recommended option is P2. In the example of FIG. 2 for C3 block, that would give $QP_{base}(C3)=QP(L6)$.

c) Average of Several Selected Pixel Matches

In another embodiment, a plurality of reference samples are selected in the chroma block. The chroma base QP is then defined as a function (e.g. average, median, min or max, weighted average where weights are derived from relative surface as in b)) of QPs of luma blocks containing luma samples spatially corresponding to the plurality of reference samples. For example, one could take the average of QPs of luma blocks containing luma samples matching, i.e. co-located with, P1 and P2, or P3 and P4, or all P1 to P4.

In the example of FIG. 2 for block C3, if taking the average of luma blocks containing luma samples spatially corresponding to P3 and P4, OP base (C3)=(QP(L5)+QP(L4))/2. It can also be an approximation of (QP(L5)+QP(L4))/2 because of rounding errors.

d) Pixel Selection Dependent on Block Shape

In one embodiment, a reference chroma sample is selected depending on block shape. The chroma base QP is then defined as the QP of the luma block containing the luma sample spatially corresponding, i.e. co-located (possibly taking into account rescaling in case chroma is subsampled with respect to luma) to this reference sample.

For example, one could select P2 for square blocks, P3 for vertical rectangular blocks, and P4 for horizontal rectangular blocks.

In another embodiment, one or more reference chroma samples are selected depending on block shape. For example, the chroma base QP can be defined as the average QP of luma blocks containing the luma samples matching, i.e. co-located with, P3 and P4 for square blocks, P3 only for vertical blocks, and P4 only for horizontal blocks.

Other functions can be used to combine QPs instead of average: median, minimum, maximum, etc.

In one embodiment, a flag is transmitted that directs the decoder to either take the minimum or the maximum of possible QPs. As an example, in the case where the flag equal 0 the minimum of QP values is taken. Otherwise (flag=1) the maximum value is taken. In a variant, a syntax element is encoded (decoded respectively) to indicate the method (average, minimum, maximum, median, etc) used to combine the QPs.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 6:
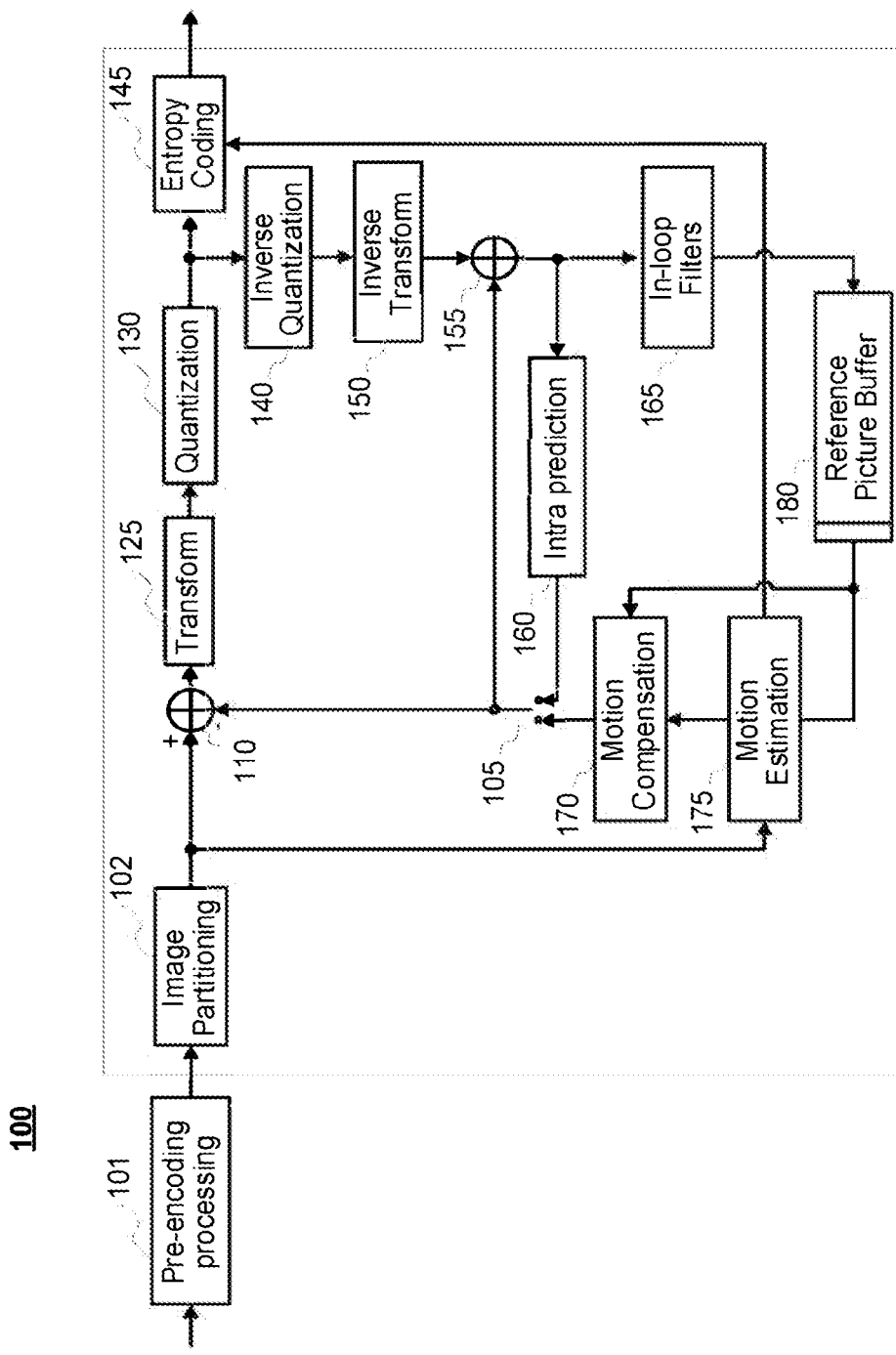
FIG. 6 depicts an encoder according to an embodiment.
Figure 7:
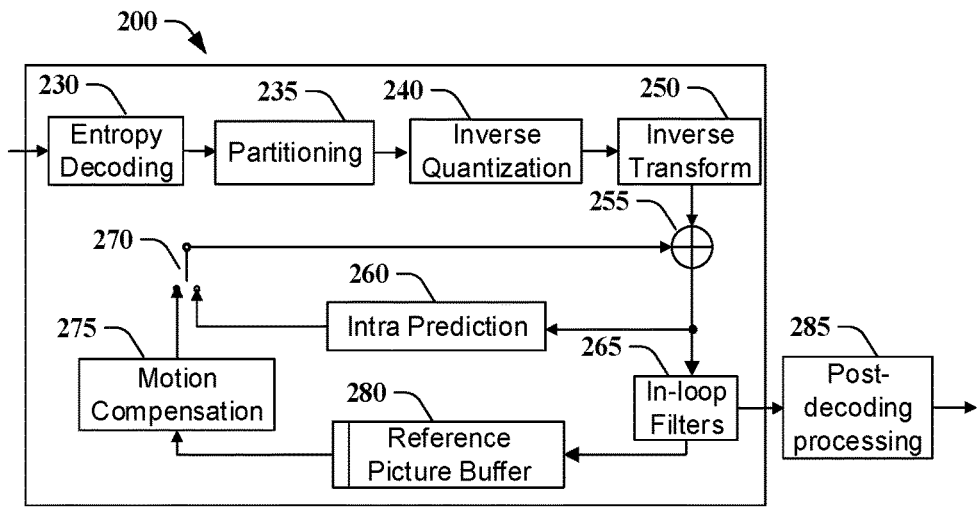
FIG. 7 depicts a decoder according to an embodiment.
Figure 8:
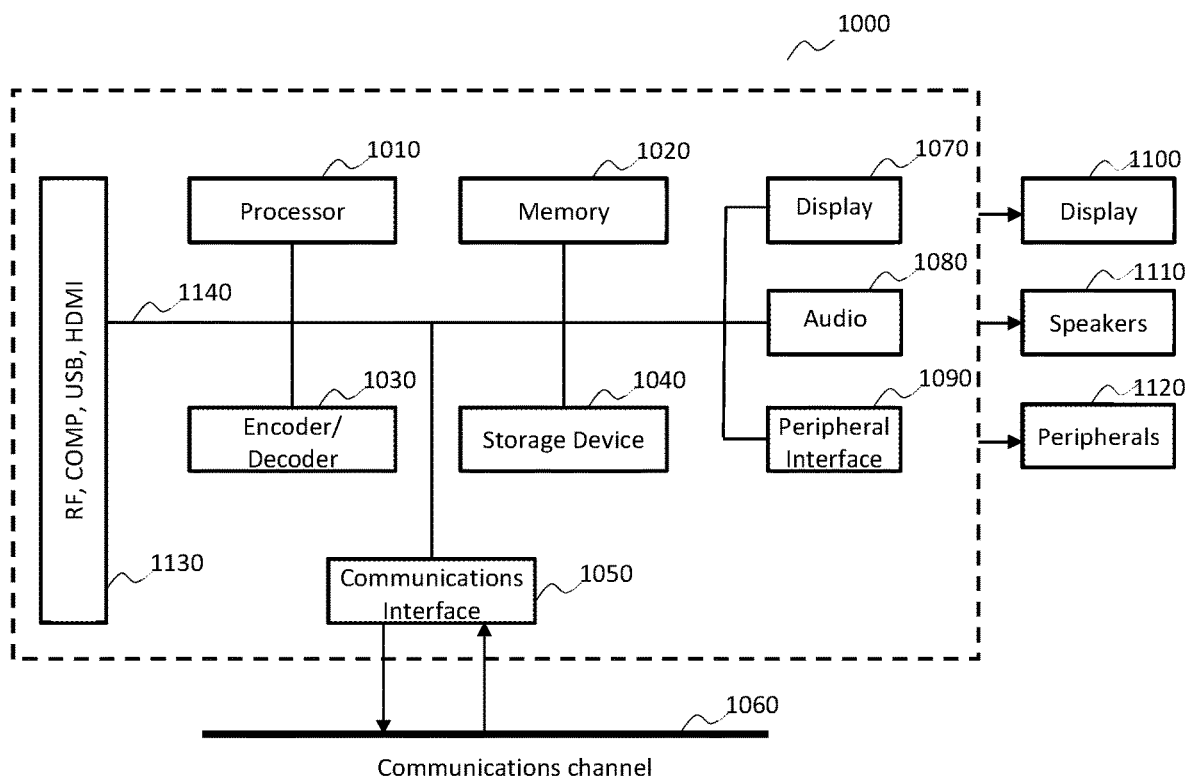
FIG. 8 illustrates a block diagram of an example of a system in which various aspects and embodiments are implemented.

The aspects described and contemplated in this application can be implemented in many different forms. FIGS. 6, 7 and 8 below provide some embodiments, but other embodiments are contemplated and the discussion of FIGS. 6, 7 and 8 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the quantization and/or inverse quantization modules (130, 140, 240), of a video encoder 100 and decoder 200 as shown in FIG. 10 and FIG. 11. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, the number of selected chroma samples. The specific values are for example purposes and the aspects described are not limited to these specific values.

FIG. 6 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 7 illustrates a block diagram of a video decoder 200. In the decoder 200, a bitstream is decoded by the decoder elements as described below. Video decoder 200 generally performs a decoding pass reciprocal to the encoding pass as described in FIG. 12. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 8 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display.

The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination. Further, embodiments can include one or more of the following features, devices, or aspects, alone or in any combination, across various claim categories and types:

- Obtaining a QP of a luma block comprising one luma sample co-located with a chroma sample of a current chroma block.
- Obtaining QPs of luma blocks comprising luma samples co-located with chroma samples of a current chroma block and combining these luma QPs into a single luma QP.
- The chroma sample is the top-left sample, left-center sample, top-center sample or the center sample of the current chroma block.
- Obtaining QPs of luma blocks co-located with the current chroma block.
- Combining these luma QPs into a single luma QP comprises averaging the luma QPs.
- The averaging is a weighted average.
- Combining these luma QPs into a single luma QP comprises selecting the median luma QP.
- Combining these luma QPs into a single luma QP comprises selecting the min or max luma QP.
- A bitstream or signal that includes one or more of the described syntax elements, or variations thereof
- Inserting in the signaling syntax elements that enable the decoder to adapt the function used to combine a plurality of luma QPs into one luma QP in a manner corresponding to that used by an encoder.
- Creating and/or transmitting and/or receiving and/or decoding a bitstream or signal that includes one or more of the described syntax elements, or variations thereof
- A TV, set-top box, cell phone, tablet, or other electronic device that performs quantization or dequantization according to any of the embodiments described.
- A TV, set-top box, cell phone, tablet, or other electronic device that performs quantization or dequantization according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs dequantization according to any of the embodiments described.

A TV, set-top box, cell phone, tablet, or other electronic device that receives (e.g. using an antenna) a signal over the air that includes an encoded image, and performs dequantization according to any of the embodiments described.

The invention claimed is:

1. A decoding method comprising:
   obtaining a plurality of representative samples, the plurality of representative samples being a subset of samples of a current chroma block, the current chroma block belonging to a coding tree unit comprising a plurality of luma blocks and at least one other chroma block in addition to the current chroma block, the coding tree unit being coded in a form of a dual coding tree;
   for each representative sample of two or more of the representative samples of the plurality, determining a respective luma sample of the coding tree unit co-located with the representative sample and obtaining a respective quantization parameter of the luma block comprising the respective luma sample;
   determining a quantization parameter to apply to the current chroma block based on a combination of the obtained quantization parameters; and
   decoding the current chroma block using the quantization parameter of the current chroma block, wherein the representative samples of the plurality are obtained among the following samples:
   a center-top sample with coordinates (W/2, 0) from a top-left corner of the current chroma block, where W is a width of the current chroma block;
   a center-left sample with coordinates (0, H/2) from the top-left corner of the current chroma block, where H is a height of the current chroma block;
   a center sample with coordinates (W/2, H/2) from the top-left corner of the current chroma block; and
   a top-left sample with coordinates (0, 0) from the top-left corner of the current chroma block.

2. Non-transitory information storage medium storing a computer program comprising program code instructions which can be loaded in a programmable device for implementing the method according to claim 1 when the program code instructions are run by the programmable device.

3. The method of claim 1, wherein the combination of the obtained quantization parameters is an average of the obtained quantization parameters, a median of the obtained quantization parameters, a minimum of the obtained quantization parameters, a maximum of the obtained quantization parameters, or a weighted average of the obtained quantization parameters.

4. The method of claim 1, wherein the combination of the obtained quantization parameters is responsive to a syntax element that indicates how to combine the obtained quantization parameters.

5. The method of claim 1, wherein, responsive to the combination of the quantization parameters being a minimum of the obtained quantization parameters or a maximum of the obtained quantization parameters, a flag indicates either to take the minimum or the maximum of the obtained quantization parameters.

6. The method of claim 1, wherein the representative samples are selected based on a current chroma block shape.

7. The method of claim 1, wherein, responsive to the combination of the quantization parameters being a weighted average of the obtained quantization parameters, for each representative sample of the two or more of the representative samples of the plurality, a weight of the weighted average applied to the quantization parameter of the luma block comprising the luma sample co-located with the representative sample depends on an intersecting surface between the luma block and the current chroma block.

8. A decoding apparatus comprising one or more processors configured to perform:
   obtaining a plurality of representative samples, the plurality of representative samples being a subset of samples of a current chroma block, the current chroma block belonging to a coding tree unit comprising a plurality of luma blocks and at least one other chroma block in addition to the current chroma block, the coding tree unit being coded in a form of a dual coding tree;
   for each representative sample of two or more of the representative samples of the plurality, determining a respective luma sample of the coding tree unit co-located with the representative sample and obtaining a respective quantization parameter of the luma block comprising the respective luma sample;
   determining a quantization parameter to apply to the current chroma block based on a combination of the obtained quantization parameters; and
   decoding the current chroma block using the quantization parameter of the current chroma block, wherein the representative samples of the plurality are obtained among the following samples:
   a center-top sample with coordinates (W/2, 0) from a top-left corner of the current chroma block, where W is a width of the current chroma block;
   a center-left sample with coordinates (0, H/2) from the top-left corner of the current chroma block, where H is a height of the current chroma block;
   a center sample with coordinates (W/2, H/2) from the top-left corner of the current chroma block; and
   a top-left sample with coordinates (0, 0) from the top-left corner of the current chroma block.

9. The apparatus of claim 8, wherein the combination of the obtained quantization parameters is an average of the obtained quantization parameters, a median of the obtained quantization parameters, a minimum of the obtained quantization parameters, a maximum of the obtained quantization parameters, or a weighted average of the obtained quantization parameters.

10. The apparatus of claim 8, wherein the combination of the obtained quantization parameters is responsive to a syntax element that indicates how to combine the obtained quantization parameters.

11. The apparatus of claim 8, wherein, responsive to the combination of the quantization parameters being a minimum of the obtained quantization parameters or a maximum of the obtained quantization parameters, a flag indicates either to take the minimum or the maximum of the obtained quantization parameters.

12. The apparatus of claim 8, wherein the representative samples are selected based on a current chroma block shape.

13. The apparatus of claim 8, wherein, responsive to the combination of the obtained quantization parameters being a weighted average of the obtained quantization parameters, for each representative sample of the two or more of the representative samples of the plurality, a weight of the weighted average applied to the quantization parameter of the luma block comprising the luma sample co-located with the representative chroma sample depends on an intersecting surface between the luma block and the current chroma block.

14. An encoding method comprising:
obtaining a plurality of representative samples, the plurality of representative samples being a subset of samples of a current chroma block, the current chroma block belonging to a coding tree unit comprising a plurality of luma blocks and at least one other chroma block in addition to the current chroma block, the coding tree unit being coded in a form of a dual coding tree;
for each representative sample of two or more of the representative samples of the plurality, determining a respective luma sample of the coding tree unit co-located with the representative sample and obtaining a respective quantization parameter of the luma block comprising the respective luma sample;
determining a quantization parameter to apply to the current chroma block based on a combination of the obtained quantization parameters; and
encoding the current chroma block using the quantization parameter of the current chroma block, wherein the representative samples of the plurality are obtained among the following samples:
a center-top sample with coordinates (W/2, 0) from a top-left corner of the current chroma block, where W is a width of the current chroma block;
a center-left sample with coordinates (0, H/2) from the top-left corner of the current chroma block, where H is a height of the current chroma block;
a center sample with coordinates (W/2, H/2) from the top-left corner of the current chroma block; and
a top-left sample with coordinates (0, 0) from the top-left corner of the current chroma block.

15. The method of claim 14, wherein the combination of the obtained quantization parameters is an average of the obtained quantization parameters, a median of the obtained quantization parameters, a minimum of the obtained quantization parameters, a maximum of the obtained quantization parameters, or a weighted average of the obtained quantization parameters.

16. The method of claim 14, wherein the combination of the obtained quantization parameters is responsive to a syntax element that indicates how to combine the obtained quantization parameters.

17. The method of claim 14, wherein, responsive to the combination of the quantization parameters being a minimum of the obtained quantization parameters or a maximum of the obtained quantization parameters, a flag indicates either to take the minimum or the maximum of the obtained quantization parameters.

18. The method of claim 14, wherein the representative samples are selected based on a current chroma block shape.

19. The method of claim 14, wherein, responsive to the combination of the quantization parameters being a weighted average of the obtained quantization parameters, for each representative sample of the two or more of the representative samples of the plurality, a weight of the weighted average applied to the quantization parameter of the luma block comprising the luma sample co-located with the representative sample depends on an intersecting surface between the luma block and the current chroma block.

20. Non-transitory information storage medium storing a computer program comprising program code instructions which can be loaded in a programmable device for implementing the method according to claim 14 when the program code instructions are run by the programmable device.

21. An encoding apparatus comprising one or more processors configured to perform:
obtaining a plurality of representative samples, the plurality of representative samples being a subset of samples of a current chroma block, the current chroma block belonging to a coding tree unit comprising a plurality of luma blocks and at least one other chroma block in addition to the current chroma block, the coding tree unit being coded in a form of a dual coding tree;
for each representative sample of two or more of the representative samples of the plurality, determining a respective luma sample of the coding tree unit co-located with the representative sample and obtaining a respective quantization parameter of the luma block comprising the respective luma sample;
determining a quantization parameter to apply to the current chroma block based on a combination of the obtained quantization parameters; and
encoding the current chroma block using the quantization parameter of the current chroma block, wherein the representative samples of the plurality are obtained among the following samples:
a center-top sample with coordinates (W/2, 0) from a top-left corner of the current chroma block, where W is a width of the current chroma block;
a center-left sample with coordinates (0, H/2) from the top-left corner of the current chroma block, where H is a height of the current chroma block;
a center sample with coordinates (W/2, H/2) from the top-left corner of the current chroma block; and
a top-left sample with coordinates (0, 0) from the top-left corner of the current chroma block.

22. The apparatus of claim 21, wherein the combination of the obtained quantization parameters is an average of the obtained quantization parameters, a median of the obtained quantization parameters, a minimum of the obtained quantization parameters, a maximum of the obtained quantization parameters, or a weighted average of the obtained quantization parameters.

23. The apparatus of claim 21, wherein the combination of the obtained quantization parameters is responsive to a syntax element that indicates how to combine the obtained quantization parameters.

24. The apparatus of claim 21, wherein, responsive to the combination of the obtained quantization parameters being a minimum of the obtained quantization parameters or a maximum of the obtained quantization parameters, a flag indicates either to take the minimum or the maximum of the obtained quantization parameters.

25. The apparatus of claim 21, wherein the representative samples are selected based on a current chroma block shape.

26. The apparatus of claim 21, wherein, responsive to the combination being a weighted average of the obtained quantization parameters, for each representative sample of the two or more of the representative samples of the plurality, a weight of the weighted average applied to the quantization parameter of the luma block comprising the luma sample co-located with the representative sample depends on an intersecting surface between the luma block and the current chroma block.

\* \* \* \* \*